United States Patent

Schloss

[11] Patent Number: 5,914,076
[45] Date of Patent: Jun. 22, 1999

[54] PROCESS FOR PRODUCING LONGER-LASTING, HIGH LUMINESCENCE, PHOSPHORESCENT TEXTILE FIBERS

[75] Inventor: Marc Schloss, Toronto, Canada

[73] Assignee: The Glo-Tech Corporation, New York, N.Y.

[21] Appl. No.: 08/948,718

[22] Filed: Oct. 10, 1997

[51] Int. Cl.$^6$ ................................ D01F 1/10; D02G 3/02
[52] U.S. Cl. ........................ 264/21; 264/103; 264/143; 264/211
[58] Field of Search ............................ 264/21, 143, 211, 264/103

[56] References Cited

U.S. PATENT DOCUMENTS

| | | |
|---|---|---|
| 2,787,558 | 4/1957 | Wadely . |
| 4,211,813 | 7/1980 | Gravisse et al. . |
| 4,629,583 | 12/1986 | Goguen . |
| 4,781,647 | 11/1988 | Doane, Jr. . |
| 5,140,060 | 8/1992 | Taguchi et al. . |
| 5,321,069 | 6/1994 | Owens . |
| 5,424,006 | 6/1995 | Murayama et al. . |
| 5,607,621 | 3/1997 | Ishihara et al. ........................ 264/21 X |
| 5,674,437 | 10/1997 | Geisel ........................................ 264/21 |

FOREIGN PATENT DOCUMENTS

| | | | |
|---|---|---|---|
| 63-165517 | 7/1988 | Japan ......................................... 264/21 |
| 2042578 | 9/1980 | United Kingdom . |

*Primary Examiner*—Leo B. Tentoni
*Attorney, Agent, or Firm*—Bauer & Schaffer, LLP

[57] ABSTRACT

Flow agent particles, Aluminum Oxide C, are blended with metal oxide phosphor particles in an amount less than or equal to 2% by weight of the phosphor particles. The blended particles are finely sifted, through a 10 micron screen, in a sonic-sifting apparatus. The sifted particles are introduced into a carrier resin, thermoplastic polymers such as polyamide, polyester, and polypropylene, during the melt-stage of an extrusion and pelletizing process, to form pellets in an amount of less than or equal to 30% by weight of the polymer. The pellets are fed, via a volumetric color chip feeder, into a melt extrusion unit to form multi-filament phosphorescent textile yarn in an amount of less than or equal to 10% by volume of the polymer.

8 Claims, No Drawings

PROCESS FOR PRODUCING LONGER-LASTING, HIGH LUMINESCENCE, PHOSPHORESCENT TEXTILE FIBERS

BACKGROUND and SUMMARY

It has been recognized for some time the benefits of incorporating in textile fibers, materials that have an afterglow effect. The primary benefit is improved safety considerations due to visibility of the fibers in the dark.

Until now, the process used to achieve this objective has been to bind phosphorescent particles to the outer surface of conventional textile fibers. While the advantage of this process is that it is relatively easy to achieve, the primary disadvantage is that the phosphorescent particles can be lost due to abrasion from wear and more significantly can be lost when the fibers are washed.

A feasible solution has been found to both problems. The solution to the problems of abrasion and washfastness, is by introducing the phosphorescent particles in a solution of melted polymer, and extruding to form fibers without the presence of the particles on the surface of the fibers.

Until now, phosphorescent particles have comprised sulfide phosphors, principally zinc sulfide. The afterglow of phosphorescent fibers, comprising these phosphorescent particles, which allows these fibers to be visually recognized in the dark has been limited to less than 200 minutes. This was a limitation, in terms of utilizing these phosphorescent fibers for safety and novelty applications.

Relatively large concentration levels of the zinc sulfide phosphorescent particles were needed to maximize the level of afterglow brightness of the phosphorescent fibers. These concentration levels were between 5% to 10%, by weight, of the polymer in the fiber.

The consequence, in utilizing these large concentration levels of phosphorescent particles, has been to reduce both the tenacity of the fiber and the elongation of the fiber or even interruption of the process of production.

Tests have shown that long-term exposure of these phosphorescent fibers, comprising zinc sulfide phosphorescent pigments, to the sun's ultra-violet rays can reduce the photo resistance of the fibers by 50%.

A feasible solution has been found to the problems associated with the zinc sulfide phosphorescent pigments which is to substitute with a novel phosphorescent phosphor comprising, for example, of alkaline earth metal type aluminate activated by europium or the like. This phosphorescent phosphor shows afterglow characteristics which last much longer than those of currently available zinc sulfide phosphorescent particles and shows superior photo-resistance. Relatively low concentration levels of this phosphorescent phosphor are needed to maximize the afterglow brightness of phosphorescent fibers. These concentration levels are between 1%–3%, by weight, of the polymer in fibers.

The closest prior art to the subject invention that the applicant is aware is disclosed in WADELY, U.S. Pat. No. 2,787,558 and GRAVISSE et al., U.S. Pat. No. 4,211,813 and GOGUEN, U.S. Pat. No. 4,629,583 and DOANE, Jr., U.S. Pat. No. 4,781,647 and TAGUCHI et al., U.S. Pat. No. 5,140,060 and OWENS, U.S. Pat. No. 5,321,069 and MURAYAMA et al., U.S. Pat. No. 5,424,006 and Foreign Patent Nos. to Hahl et al., DE 3328075 and Wakita, DE 3434971 and Servadio, GB 2042578. Wadely teaches a yarn that is immersed in a solution that contains phosphorescent particles with a chemical base substance of zinc sulphide. Gravisse teaches a textile material to which a coating layer is adhered, comprising one or more synthetic resins and a phosphorescent metal sulphide such as zinc sulphide. Both Gravisse and Wadely fail to suggest how to deal with the abrasion and washfastness problems. Hahl et al. claim the preparation of filaments for fishing lines by mixing phosphorescent material with melted thermoplastic material in an extruder. Wakita claims the preparation of luminescent fibres for safety clothing at night by melt-spinning polypropylene spheres with phosphorescent material such as zinc sulfide. Doane Jr. claims a method of mixing a plurality of phosphorescent particles with an unhardened polymeric material and extruding the resultant mixture to form doll hair fibers. Doane Jr. premixes the phosphorescent particles with a coating agent in order to enhance the distribution of the phosphorescent particles in the finished fibers. Hahl et al., Wakita, and Doane Jr. fail to suggest how to deal with the problems of short-term length of luminescence, poor strength of the fibers, poor elasticity of the fibers, and degradation of the fibers' photo resistant capabilities from long-term exposure to the sun's ultra-violet rays. Goguen invents a phosphorescent polymer-containing composition for use in footwear and shoe soles. Taguchi et al. invent the addition of phosphorescent powder, such as zinc sulfide, to a matrix polymer to produce an electroluminescent device. Servadio invents a phosphorescent plastics composition comprising the pigment zinc sulfide to produce flexible labels. Goguen, Taguchi et al., and Servadio also fail to suggest how to deal with the problems of short-term length of luminescence, and degradation of the phosphorescent pigment, zinc sulfide, photo resistant capabilities from long-term exposure to the sun's ultra-violet rays. Owens invents a process for producing phosphorescent yarn utilizing a suitable wetting agent, such an oil, to coat each pellet of the polymer to be used, in a mixer or tumbler, and then adding the phosphorescent powder and tumbling until the powdered pigment adheres uniformly to each pellet in the mixer. The material is then fed to an extruder where it is processed in the conventional manner to melt the polymer and to thoroughly mix the phosphorescent material throughout the melt. Owens claims that his process enables a highly uniform distribution of phosphorescent material throughout the melt and enables operation of commercial melt spinning apparatus with a high loading of phosphorescent material, zinc sulfide pigment, and enables the production of a highly uniform product having characteristics suitable to produce a high grade commercial phosphorescent textile product. Owens fails to suggest how to produce a yarn product with a denier per filament of less than five which excludes virtually all apparel yarn. Owens fails to suggest how to produce a Nylon BCF yarn that has the physical characteristics of standard tenacity (2.5) and standard elongation (35%). Owens fails to suggest how his invention prevents the problem of the phosphorescent particles from collecting to each other, due to friction causing static electricity, before the particles are adhered to the polymeric pellets causing the filtration screens in the extruder systems to become plugged and interrupting the process of yarn production entirely in some instances. Murayama et al. describe a metal oxide phosphorescent phosphor that is an improvement to sulfide phosphors in terms of the time length of maximum luminescence, the level of after-glow brightness, and the photo-resistance to the ultra-violet rays in both natural and artificial light. The phosphorescent phosphor described by Murayama et al. may be coated on the surface of various products and may be mixed into a plastic material, rubber or glass. Murayama et al. fail to suggest how to sieve, or filter, the phosphorescent phosphor finer than a 100 mesh (150 micron) sieve which limits the possible applications. Murayama et al. fail to suggest how to prevent the phosphor particles from collecting to each other, due to friction causing static electricity when sieved or filtered, and thereby plugging the filtration screens of an extrusion system when the phosphors are mixed into a plastic material. Murayama et al. fail to suggest that when mixing the phosphorescent phosphor into plastic material that two entry ports should be used, one for the polymeric material resin and one for the phosphorescent phosphor into the melted polymeric material. Due to the metallic composition of the phosphor, the phosphor particles are a hard substance whose abrasiveness could damage the extrusion equipment if mixed directly with the polymeric material pellets. Murayama et al. fail to suggest the mixing of this phosphorescent phosphor in a melt solution comprising a polymer known for producing textile fibers such as polyester, PET or PBT. Murayama et al. also fails to suggest the extrusion of textile fibers from this composition of materials as a possible application utilizing this phosphorescent phosphor. Therefore, Murayama et al. is believed to be of only general interest in the context of the subject invent ion.

SUMMARY AND DETAILED DESCRIPTION OF THE INVENTION

The first step is to mix a phosphorescent phosphor, preferably a metal oxide phosphorescent phosphor comprising an alkaline earth metal type aluminate activated by europium, with a free-flow agent, preferably Aluminum Oxide C, and sieve the resultant mixture through a 10 micron screen in a sonic sifting machine. Conventional processing steps can sieve particles down to a maximum of 20 microns or less. Sieving particles to a maximum less than 20 microns is considered impossible due to static electricity that collect individual particles to each other. The sonic sifting apparatus allows the sieving of the phosphorescent phosphor particles to a maximum of 10 microns or less. The sieving process utilizes an oscillating air column that moves the particles through a stack of screens. A series of electro-mechanical pulses help deagglomerate particles, especially in the sub-sieve range of less than 20 microns, with electrostatic adhesion. Almost all powdered phosphorescent pigment particles develop an electrostatically negative charge under the influence of friction with each other, other materials, or in contact with the walls of processing equipment. A loading of Aluminum Oxide C of between 0.1% and 2.0%, by weight of the phosphorescent particles, with the phosphor particles can neutralize the electrostatic charge and impart the desired flow characteristics to the phosphor particles as they are sieved. The Aluminum Oxide C has an average particle size of less than 1 micron.

Grinding or milling the phosphorescent phosphor particles is not a feasible alternative because this would break down the particle crystals and destroy the afterglow.

Utilizing a suitable wetting agent, such an oil, to coat each pellet of the polymer to be used, in a mixer or tumbler, and then adding the metal oxide phosphorescent phosphor and tumbling until the powdered pigment adheres uniformly to each pellet in the mixer is not a feasible alternative. When mixing the phosphorescent phosphor into plastic material two entry ports should be used, one for the polymeric material resin and one for the phosphorescent phosphor into the melted polymeric material. Due to the metallic composition of the phosphor, the phosphor particles are a hard substance whose abrasive ness could damage the extrusion equipment if mixed directly with the polymeric material pellets The phosphorescent particles, prepared in the first step, were then mixed with a polymer, preferably polyester but alternatively polyamide or polypropylene, during the melt-stage of an extrusion and pelletizing process to produce a masterbatch, a concentrated mixture of an additive in a carrier system. When mixing the phosphorescent phosphor into the plastic material two entry ports were used, one for the polymeric material resin and one for the phosphorescent phosphor into the melted polymeric material. A maximum concentration level of the phosphorescent phosphor particles is 30%, by weight of the polymer, in the masterbatch. The phosphorescent phosphor and melted polymeric material mixture were filtered relatively finely during the extrusion and pelletizing process.

The masterbatch pellets were dried overnight in a special oven at 280 degrees Fahrenheit. The pellets were dried to reduce the moisture and humidity associated with the pellets.

The masterbatch was then fed, via a volumetric color chip feeder, into a melt extrusion unit for producing partially oriented multiple filament yarn (POY). At the same time as the masterbatch was fed, virgin polymer was fed, via a chip loader or hopper, into the melt extrusion unit for producing POY. The virgin polymer that was added to the masterbatch was nine times, or more, the volume of the masterbatch. The combined masterbatch and virgin polymer melted material was filtered finely in the melt extrusion unit for producing POY. The POY was then fed into a false-twist texturing unit for drawing and texturizing and a stretch yarn was output.

The physical properties of the yarn are acceptable for utilization in the manufacture of a variety of textile products including embroidery thread and braiding for apparel. Specifically, both the tensile strength and the elongation of the textile fibers were measured to have standard values. These values are greater than the values measured for phosphorescent fibers manufactured with phosphorescent particles comprising zinc sulfide. The denier per filament (d.p.f.) of the yarn produced was as low as two compared with a d.p.f. of five or greater for yarn produced with the zinc sulfide phosphorescent pigment.

The afterglow extinction time, the afterglow brightness, and the photo-resistance were measured for phosphorescent fibers manufactured utilizing the metal oxide compound comprising an alkaline earth metal type aluminate activated by europium as a phosphor and for phosphorescent fibers utilizing the zinc sulfide compound as a phosphor. The afterglow extinction time and the afterglow brightness were measured to be 10 times greater for fibers produced with the metal oxide compound versus fibers produced with the zinc sulfide compound. The photo-resistance, after 12 hours uninterrupted exposure to a 300 W mercury lamp, was 100% greater for the fibers manufactured with the metal oxide compound versus the fibers manufactured with the zinc sulfide compound.

It is the primary object of the present invention to provide an improved method of manufacturing phosphorescent fibers which have an enhanced after-glow to radiant energy.

Another object is to provide a method which enables loading of the polymer material with a relatively low percentage of finely divided phosphorescent phosphor pigment to produce a high degree of phosphorescence.

Another object is to provide a method of manufacturing relatively thin, phosphorescent fibers or filaments acceptable for utilization in the manufacture of a variety of textile products.

Another object is to provide an improved phosphorescent textile fiber or filament which has a relatively greater tenacity, elongation and photo-resistance.

DETAILED DESCRIPTION OF THE PREFERRED EMBODIMENT

Approximately 7.6 pounds of a metal oxide phosphorescent phosphor, supplied by United Mineral & Chemical Corporation, Lyndhurst, N.J. under the trade name LUMINOVA, was mixed with a 2% concentration level, by weight of the phosphor, free-flow agent, Aluminum Oxide C supplied by Degussa Corporation, Akron, Ohio.

The phosphorescent phosphor has an average particle size of 7 microns with a possible particle size range between 5 and 9 microns inclusive. The Aluminum Oxide C has an average primary particle size of 0.1 microns. The range of possible concentration level values of the Aluminum Oxide C is 0.1% to 2.0% inclusive, by weight, of the phosphor. The mixture was then sieved through a 10 micron screen in a sonic sifting apparatus. The phosphorescent particles, prepared in the first step, were then mixed with approximately 17.7 pounds of a polyester, Polybutylene terephthalate (PBT), during the melt-stage of an extrusion and pelletizing process to produce a masterbatch with a 30% concentration level of the phosphorescent phosphor, by weight of the PBT polymer. When mixing the phosphorescent phosphor into the PBT material two entry ports were used, one for the PBT resin and one for the phosphorescent phosphor into the melted PBT material. The phosphorescent phosphor and melted polymeric material mixture were filtered through a 25 micron screen during the extrusion and pelletizing process. The masterbatch produced weighed approximately 25 pounds.

The masterbatch pellets were dried overnight in a special oven at 280 degrees Fahrenheit. The pellets were dried to reduce the moisture and humidity associated with the pellets.

The masterbatch was then fed, via a volumetric color chip feeder, into a melt extrusion unit for producing partially oriented multiple filament yarn (POY). At the same time as the masterbatch was fed, virgin PBT polymer was fed, via a chip loader or hopper, into the melt extrusion unit for producing POY. The goal was to lower the concentration level of the phosphorescent phosphor from 30%, by weight, of the PBT in the masterbatch to 3%, by volume, of the PBT in the mixture of the masterbatch and the melted virgin PBT material. Therefore, the virgin PBT polymer that was added to the masterbatch was nine times the volume of the masterbatch, or approximately 225 pounds. The range of possible concentration level values for the phosphorescent phosphor is 1%–3% inclusive, by volume, of the PBT in the mixture of the masterbatch and the melted virgin PBT material. The combined masterbatch and virgin PBT melted material was filtered through a 25 micron screen in the melt extrusion unit for producing POY.

A partially oriented yarn (POY) was extruded from the melt spinning machine with a nominal denier of between 120 denier and 267 denier and 68 filaments. The tenacity of the POY was measured to be approximately 1.75 (the breaking load measurement divided by the total denier) and the elongation of the POY was measured to be 70%. Both the tenacity and the elongation of the textile fibers are considered to be acceptable for utilization in the manufacture of a variety of textile products.

The POY was drawn and texturized in a false-twist texturizing machine producing a stretch yarn with a final denier of between 84 and 187 denier and 68 filaments.

What we claim is:

1. In a melt extrusion process for producing multiple textile filaments from melted polymer material in which the virgin polymer material in pellet form is fed via a chip loader in a melt extrusion unit where it is heated and mixed to form a melt and the melt is extruded to form the filaments having an enhanced after-glow to radiant energy, the improvement comprising, initially mixing a plurality of phosphorescent phosphor particles and a plurality of free-flow agent particles in a mixer, sieving the resultant mixture through a 10 micron screen in a sonic sifting machine, feeding the sieved particles in an extrusion and pelletizing process for formimg masterbatch pellets from a melted thermoplastic polymer material in which the polymer in pellet form is fed into an extruder from one entry port and the sieved particles are fed into an extruder from a second entry port in an amount of less than or equal to 30% by weight of the polymer in pellet form into the melted thermoplastic polymer material, feeding the phosphorescent masterbatch pellets into a melt extrusion unit via a volumetric color chip feeder and adding virgin polymer pellets in an amount of about nine times or more by volume of the masterbatch pellets and extruding the melted mixture to form filaments whereby a highly uniform dispersion of the phosphorescent phosphor particles is obtained throughout the filaments.

2. The process defined in claim 1, wherein said polymer is selected from the group consisting of polyamide, polyester and polypropylene.

3. The process defined in claim 1, wherein said phosphorescent particles comprise an alkaline earth metal type aluminate phosphor activated by europium.

4. The process defined in claim 1, wherein said free-flow agent particles comprise aluminum Oxide C.

5. The process defined in claim 1, wherein said free-flow agent particles have a mean particle size of approximately 0.1 microns.

6. The process defined in claim 1, wherein said phosphorescent phosphor particles comprise between 1% and 3% inclusive by volume of the polymer in the multiple textile filaments.

7. The process defined in claim 1, wherein said free-flow agent particles comprise between 0.1% and 2% inclusive by weight of the phosphorescent particles.

8. The process defined in claim 1, wherein the step of extruding the melt comprises simultaneously melt spinning a plurality of filament to form spun yarn.

* * * * *